(12) United States Patent
Van Haaren et al.

(10) Patent No.: US 10,323,848 B2
(45) Date of Patent: Jun. 18, 2019

(54) MOISTURE DETECTING AIR CAP INDICATOR FOR EXPANSION TANK FAILURE

(71) Applicant: AMTROL Licensing Inc., West Warwick, RI (US)

(72) Inventors: Christopher A. Van Haaren, Warwick, RI (US); Kenneth Cerpovicz, Warwick, RI (US); Christopher Kampf, Chepachet, RI (US)

(73) Assignee: AMTROL LICENSING INC., West Warwick, RI (US)

( * ) Notice: Subject to any disclaimer, the term of this patent is extended or adjusted under 35 U.S.C. 154(b) by 0 days.

(21) Appl. No.: 15/911,787

(22) Filed: Mar. 5, 2018

(65) Prior Publication Data

US 2018/0195740 A1 Jul. 12, 2018

Related U.S. Application Data

(63) Continuation of application No. 14/291,894, filed on May 30, 2014, now Pat. No. 9,915,433.

(51) Int. Cl.
*F24D 3/00* (2006.01)
*F24D 3/10* (2006.01)
(Continued)

(52) U.S. Cl.
CPC ............. *F24D 3/1008* (2013.01); *F15B 1/10* (2013.01); *F16J 3/02* (2013.01); *F16L 55/053* (2013.01);
(Continued)

(58) Field of Classification Search
CPC ........ F24D 3/1008; F24D 3/1016; F15B 1/10; F15B 2201/50; F15B 2201/30; F16J 3/02; F16L 55/053; G01M 3/00; G01M 3/042
(Continued)

(56) References Cited

U.S. PATENT DOCUMENTS 1,579,536 A 4/1926 Hodgson
2,716,338 A 8/1955 Blinn
(Continued)

FOREIGN PATENT DOCUMENTS

DE 9309620 U1 9/1993
EP 0684429 4/1995
(Continued)

OTHER PUBLICATIONS

PCT International Search Report and Written Opinion for PCT International Application No. PCT/US2015/032644 dated Aug. 28, 2015, 11 pages.
(Continued)

*Primary Examiner* — Ernesto Grano
(74) *Attorney, Agent, or Firm* — Tucker Ellis, LLP; Patrick Clunk; Carlos Garritano

(57) ABSTRACT

Disclosed is an expansion tank having an internal cavity separated by a flexible diaphragm to form an upper pressurized gas portion and a lower pressurized fluid portion, and an indicator positioned at an upper part of the expansion tank in communication with the contents of the upper pressurized gas portion. The indicator is configured so as to display a first color if the operating conditions are normal in the pressurized gas portion, and a second color if the amount of moisture detected in the pressurized gas portion greater than or equal to a predetermined amount. Further disclosed is a method for detecting whether there is an excessive amount of moisture in a pressurized gas portion of an expansion tank by allowing pressurized gas from the pressurized gas portion to come into contact with the indicator, and viewing the color displayed by the indicator. As such, the tank can be simply visually inspected to determine whether there is a potential failure in the tank.

15 Claims, 7 Drawing Sheets

(51) Int. Cl.

| | | |
|---|---|---|
| *F15B 1/10* | (2006.01) | |
| *F16J 3/02* | (2006.01) | |
| *F16L 55/053* | (2006.01) | |
| *G01M 3/00* | (2006.01) | |
| *G01M 3/04* | (2006.01) | |

(52) U.S. Cl.
CPC ............. *F24D 3/1016* (2013.01); *G01M 3/00* (2013.01); *G01M 3/042* (2013.01); *F15B 2201/50* (2013.01); *F16L 2201/30* (2013.01)

(58) Field of Classification Search
USPC ........................................................ 220/721
See application file for complete search history.

(56) References Cited

U.S. PATENT DOCUMENTS

| | | | |
|---|---|---|---|
| 3,085,424 A | 4/1963 | Berg | |
| 3,246,758 A | 4/1966 | Wagner | |
| 3,408,860 A * | 11/1968 | Knieriem | G01N 31/222 |
| | | | 116/200 |
| 3,524,475 A | 8/1970 | Kirk, Jr. | |
| 3,854,885 A * | 12/1974 | Fromm | G01N 31/22 |
| | | | 137/551 |
| 3,948,287 A | 4/1976 | Sugimura | |
| 4,181,156 A | 1/1980 | Zahid | |
| 4,201,080 A * | 5/1980 | Slepak | A01G 25/167 |
| | | | 116/206 |
| 4,299,254 A | 11/1981 | Zahid | |
| 4,438,783 A | 3/1984 | Dreyfuss et al. | |
| 4,595,037 A | 6/1986 | LeBreton et al. | |
| 5,062,455 A | 11/1991 | Schurter et al. | |
| 5,176,178 A | 1/1993 | Schurter et al. | |
| 5,386,925 A | 2/1995 | Lane | |
| 6,401,966 B2 | 6/2002 | Tsai | |
| 6,871,671 B2 | 3/2005 | Weber | |
| 7,032,628 B2 | 4/2006 | Guillemette et al. | |
| 7,216,673 B2 | 5/2007 | Gremour et al. | |
| 8,033,416 B2 | 10/2011 | Wang | |
| 8,403,170 B1 | 3/2013 | Lai | |
| 8,523,001 B2 | 9/2013 | Acker | |
| 8,633,825 B2 | 1/2014 | Fuller et al. | |
| 9,146,137 B2 | 9/2015 | Van Haaren | |
| 2003/0024465 A1 | 2/2003 | Perner et al. | |
| 2003/0056711 A1 | 3/2003 | Tranter | |
| 2005/0022896 A1 | 2/2005 | Cnossen et al. | |
| 2008/0034763 A1 | 2/2008 | Cho et al. | |
| 2008/0179333 A1 | 7/2008 | Fuller et al. | |
| 2008/0245289 A1 | 10/2008 | Shiraishi | |
| 2014/0275381 A1 | 9/2014 | Ribi | |
| 2016/0060765 A1 | 3/2016 | Mizuno et al. | |

FOREIGN PATENT DOCUMENTS

| | | |
|---|---|---|
| JP | S387197 Y5 | 4/1963 |
| JP | H10317521 A | 2/1998 |
| KR | 10-1996-024100 | 7/1996 |
| KR | 10-2014-0026161 | 3/2014 |
| WO | 2010033040 A1 | 3/2010 |

OTHER PUBLICATIONS

Extended European Search Report for corresponding European Patent Application No. EP 15800263.4 dated Dec. 15, 2017, 9 pages.

Wessels Company; WessView Tank Integrity Monitor; https://westank.com/wessview; May 30, 2018, 4 pages.

Notification of Reasons for Refusal; dated Apr. 18, 2019: 3 pages; Patent Appl, No. P 2016-567718.

\* cited by examiner

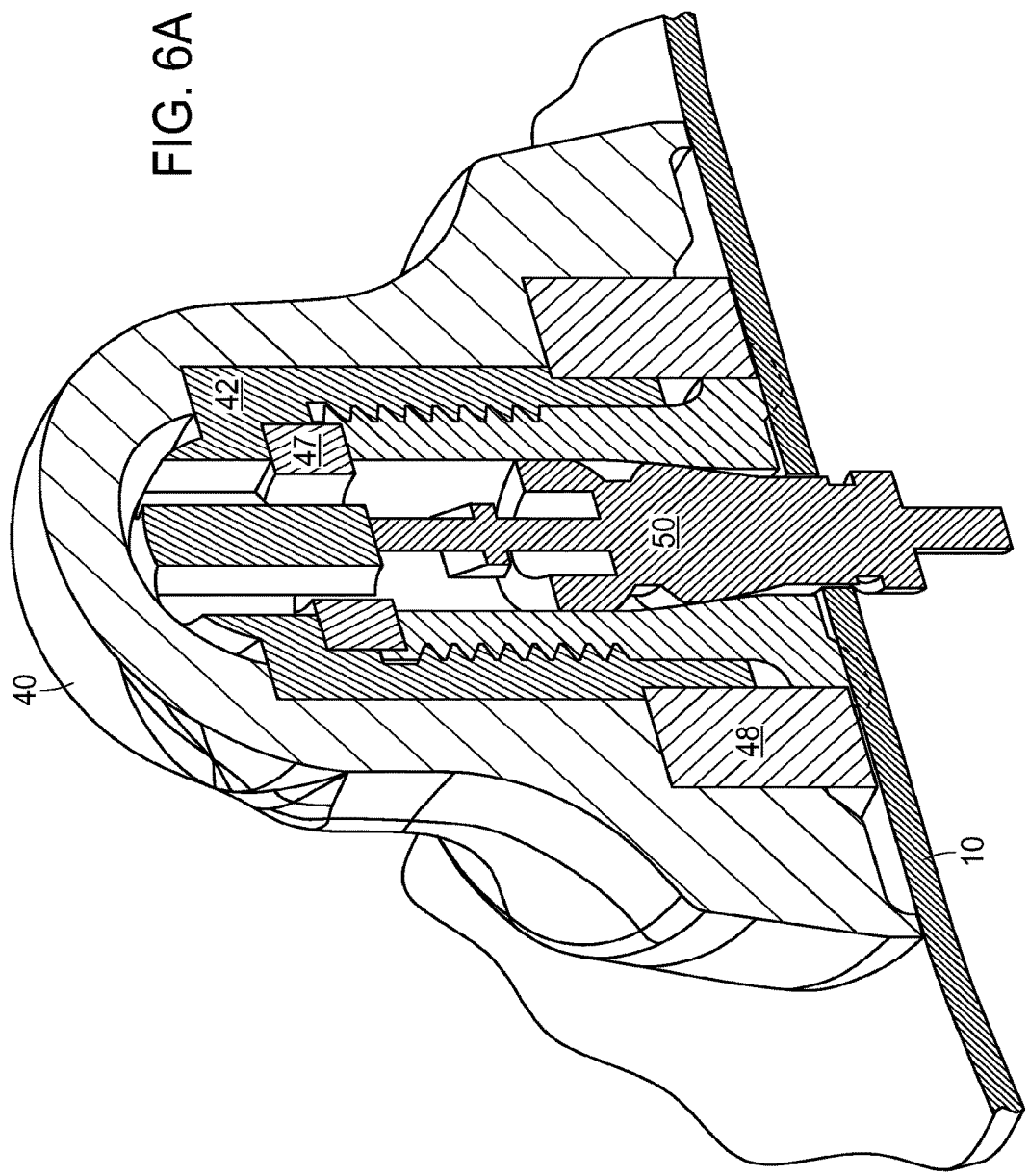

MOISTURE DETECTING AIR CAP INDICATOR FOR EXPANSION TANK FAILURE

RELATED APPLICATION DATA

This application is a continuation of U.S. patent application Ser. No. 14/291,894 filed May 30, 2014, which is hereby incorporated herein by reference.

FIELD OF INVENTION

The present invention generally relates to expansion tanks, and, more particularly, to diaphragm expansion tanks having an indicator to alert a user if moisture is present in the gas side of the expansion tank.

BACKGROUND

Expansion tanks are commonly used in heating, cooling and air condition systems to avoid unacceptable increase of system pressures during heat-up, generally by absorbing expanding fluid and limiting pressure within the system. Expansion tank designs include open tanks, closed compression tanks and diaphragm tanks.

In a diaphragm expansion tank, a diaphragm or bladder is used to separate air from water within the tank. In particular, one side of the tank is connected to piping of a heating system (or cooling/air condition system) and therefore contains the water, while the other side contains air under pressure. A Schrader valve is typically provided at the air side of the tank for checking pressure and adding air, which allows the pressure of the tank to be adjusted as needed.

An air/gas charge pressure on one side keeps the diaphragm at a distance away from the inside wall of the tank in the gas side. When the tank is installed onto a water system, the water system pressure pushes back against the diaphragm, compressing the gas. When the system is cold and the water in the tank is at the minimum level, the tank pressure is at an initial/pre-charge pressure. As the temperature in the system increases, the water expands to compress the gas chamber via the diaphragm, causing an increase in the gas and water system pressure.

However, the diaphragm has a limited life. If eventually the diaphragm "bottoms out" on the tank wall, the tank becomes ineffective in the function it has been design to provide. Various failure modes for expansion tanks include incorrect precharge pressure (e.g. a low air precharge), excessive system pressure, diaphragm failure resulting in leak of air charge, and installation of an incorrectly sized tank (e.g. undersized tank which causes the diaphragm to overwork), all of which can lead to quick cycling and ultimately failure. In such failure modes, the diaphragm can develop a pinhole, an abrasion, a cut or the like that allows water to enter the gas side of the tank. Over time, the gas will be absorbed into the water system and the gas charge will decrease to zero. At this point, the tank is considered ineffective. This can eventually cause failure of other equipment in the system or failure of the tank itself, resulting in water leakage into space surrounding the tank.

In order to determine whether there are problems in the expansion tank operation or if the expansion tank has failed, a homeowner must often require the services of a plumber to remove the tank from the system and perform tests. This is time consuming and expensive. It would, thus, be beneficial to provide a mechanism that makes it easier for a homeowner or a plumber to determine whether an expansion tank has operational problems or has failed, thus enabling more pro-active maintenance of the equipment. Such a mechanism can also beneficially alert a user to early problems in the tank, which can potentially be addressed to prevent tank failure.

SUMMARY

The present invention provides an expansion tank which includes a housing that has an upper end wall, a side wall, and a lower end wall that together define a cavity. A flexible diaphragm extends within the cavity so as to separate the cavity into an upper portion, which is sealed to contain a pressurized gas, and a lower portion, which is sealed to contain a pressurized fluid. An indicator is positioned at the upper wall of the housing so as to visually alert a user if moisture is present in the pressurized gas side of the expansion tank.

According to one embodiment, the indicator is in the form of an air cap indicator which is positioned in an upper end wall of the tank and in communication with the pressurized gas side of the tank.

According to various embodiments, the indicator comprises an insert that displays a first color. When in contact with a predetermined level of moisture or greater the indicator displays a second color Preferably, the predetermined level of moisture is a trace amount of moisture, and in some embodiments, the predetermined level of moisture is such that water droplets form and even a water volume exists. In yet further embodiments, the predetermined level of moisture is a level at which material (e.g., steel) forming the pressurized gas side of the tank will corrode and rust.

According to various embodiments, the indicator further comprises a cap at an upper portion, the insert at least partially disposed within the cap, and sidewalls extending downward from the cap to the upper end wall of the housing, wherein a gas tight and fluid tight seal is formed between the indicator and the upper end wall of the housing. According to various embodiments, at least a portion of the cap is fabricated of a transparent material through which the insert is visible. At least a portion of the cap can be fabricated of an optically magnifying material, such that the cap insert is viewable and magnified therethrough.

According to an embodiment, the cap is provided with a first color, and when the pressurized gas side of the tank is contacted with the predetermined level of moisture or greater, the material forming the pressurized gas side corrodes and rusts. This corrosion and rust will then deposit residue onto the surface of the cap. Alternatively, the cap is provided with a first color, and at least a portion of the indicator is fabricated of a material that is hydrochromic such that the first color will change to the second color when contacted with the predetermined level of moisture or greater. Preferably, this first color is a light color that will contrast with the second color and with rust, which is typically red-orange-brown-color. According to a preferred embodiment, the cap is a bright white color, which provides a sharp contrast with deposited rust. The bright white, or other color, of the cap can be provided either by the material itself forming the cap (e.g. using a white plastic material that is formed into the cap) or by coloring the cap with the desired bright white or other color.

According to various embodiments, at least a portion of the insert is coated with a hydrochromic ink. The hydrochromic ink displays the first color. The hydrochromic ink becomes clear when contacted with the predetermined level of moisture or greater and therefore the second color is displayed.

According to various embodiments, the insert is of the first color. When a predetermined amount of moisture or greater exists, rust deposits form on the first color to indicate a second color. In a further embodiment, water droplets or even a water volume can be seen through the clear portion of the cap where the insert if visible.

According to various embodiments, the indicator is disposed to enclose a valve on the upper end wall of the housing, the valve being in communication with the pressurized gas in the upper portion of the cavity.

In another embodiment, a method is provided for indicating a failure in an expansion tank comprising a flexible diaphragm, where the flexible diaphragm divides the tank into a pressurized gas side and a pressurized fluid side. An indicator is positioned in an upper end wall of the expansion tank and in fluid communication with the pressurized gas side, e.g. via a valve. The indicator includes a cap having a cap insert disposed therein. In particular, the cap has a domed portion ("cap dome"), at least a portion of which is clear so that a user can view the contents therein. The cap insert is designed so as to display a first color when the pressurized gas side of the tank is at its normal operating condition. and to display a second color when exposed to a predetermined level of moisture or greater In order to test the expansion tank, the valve is actuated to allow pressurized gas from the pressurized gas side of the tank to enter the cap dome and come into contact with the cap insert. If the pressurized gas side of the tank has been exposed to or contains a detectable level of moisture, then the cap displays the second color to indicate either problems with or failure of the expansion tank. If the pressurized gas side of the tank has not been exposed to or does not contain a detectable level of moisture, then the cap insert will display the first color to indicate that the expansion tank is operating properly. Preferably, the predetermined level of moisture is a trace amount of moisture, in some embodiments, the predetermined level of moisture such that water droplets form and even a water volume exists, and in yet other embodiments, the predetermined level of moisture is a level at which material (e.g., steel) forming the pressurized gas side of the tank will corrode and rust.

Additional objects and advantages of the invention will be set forth in part in the description which follows, and in part will be obvious from the description, or may be learned by practice of the invention. The objects and advantages of the invention will be realized and attained by means of the elements and combinations disclosed herein, including those pointed out in the appended claims. It is to be understood that both the foregoing general description and the following detailed description are exemplary and explanatory only and are not restrictive of the invention as claimed. The accompanying drawings, which are incorporated in and constitute a part of this specification, illustrate several embodiments of the invention and, together with the description, serve to explain the principles of the invention.

BRIEF DESCRIPTION OF THE DRAWINGS

FIG. 6A is an enlarged cross-sectional view of the example indicator shown in FIG. 1 in the normal operating position.

Figure 1:
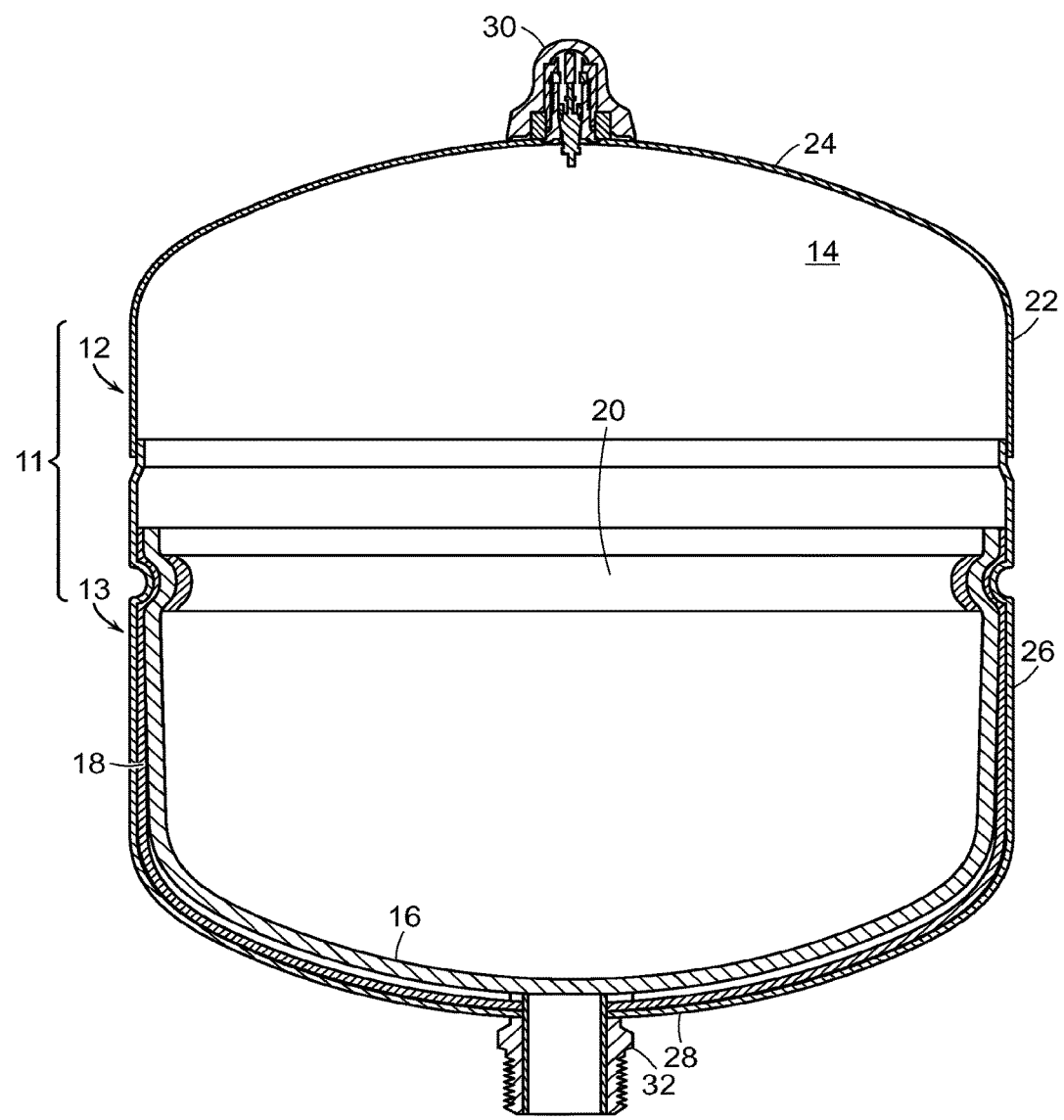
FIG. 1. is a cross-sectional view of an example prepressurized expansion tank with an indicator.
Figure 2:
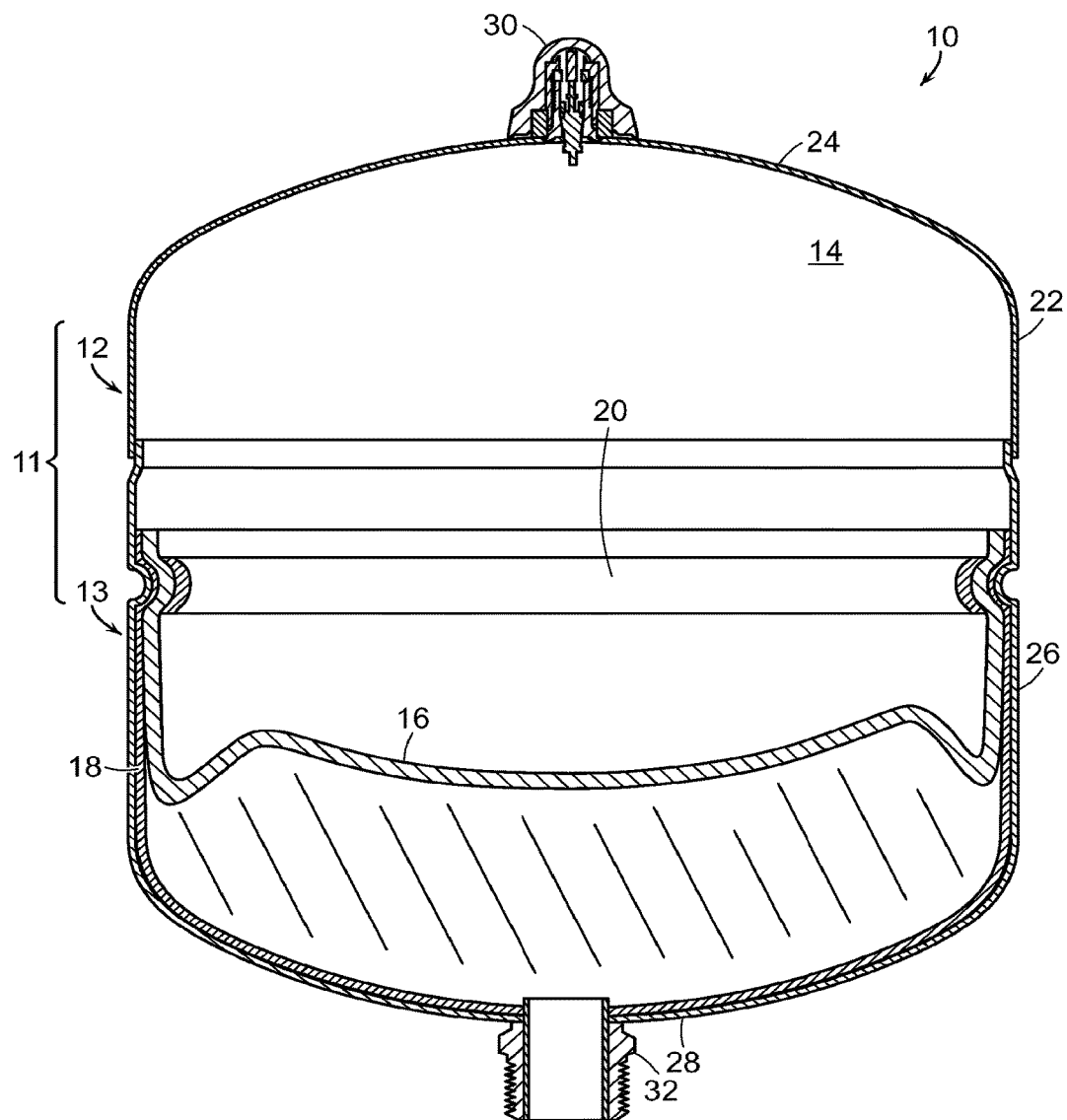
FIG. 2 is a cross-sectional view of the example expansion tank of FIG. 1 partially filled with a fluid.
Figure 3:
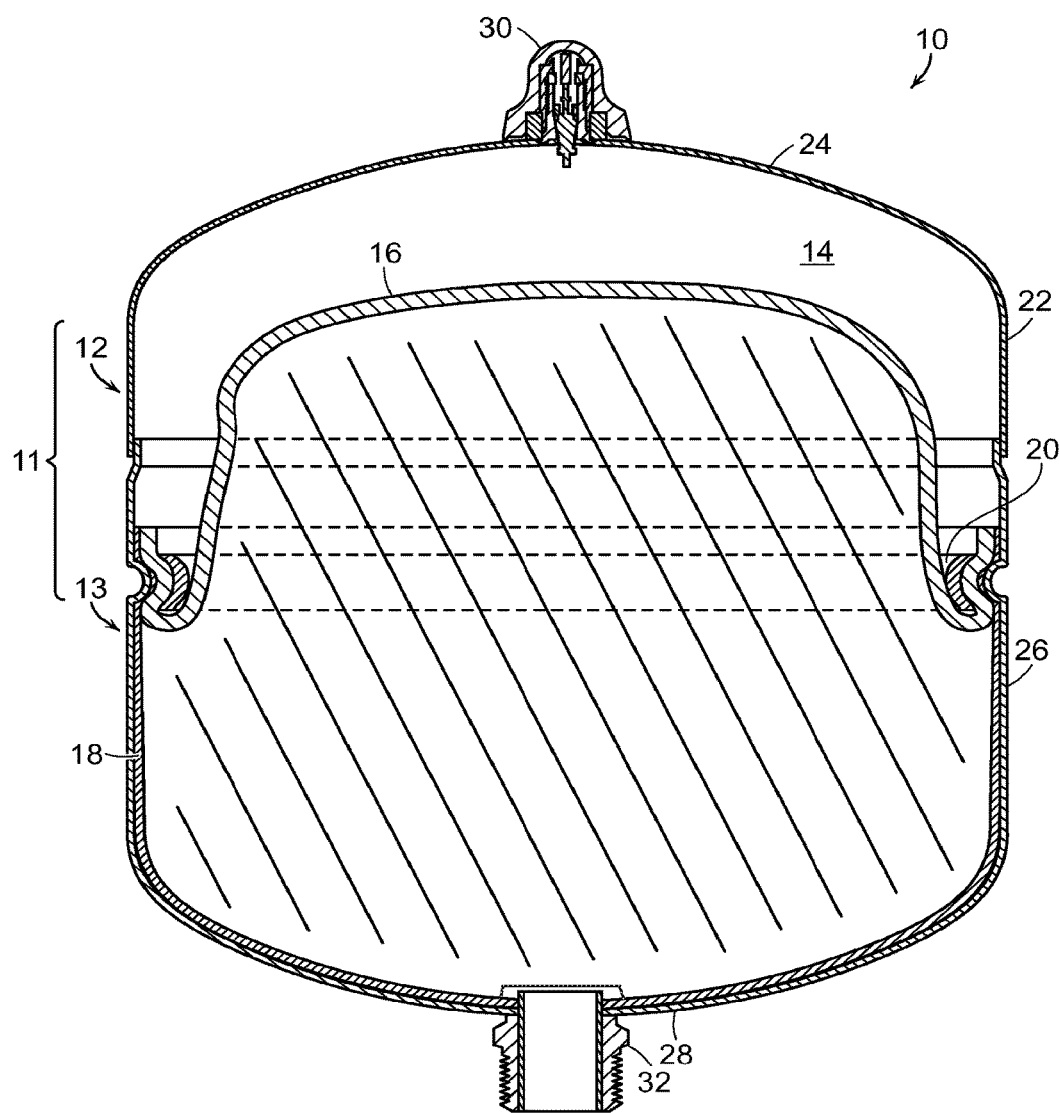
FIG. 3 is a cross-sectional view of the example expansion tank of FIG. 1 filled with a fluid.
Figure 4:
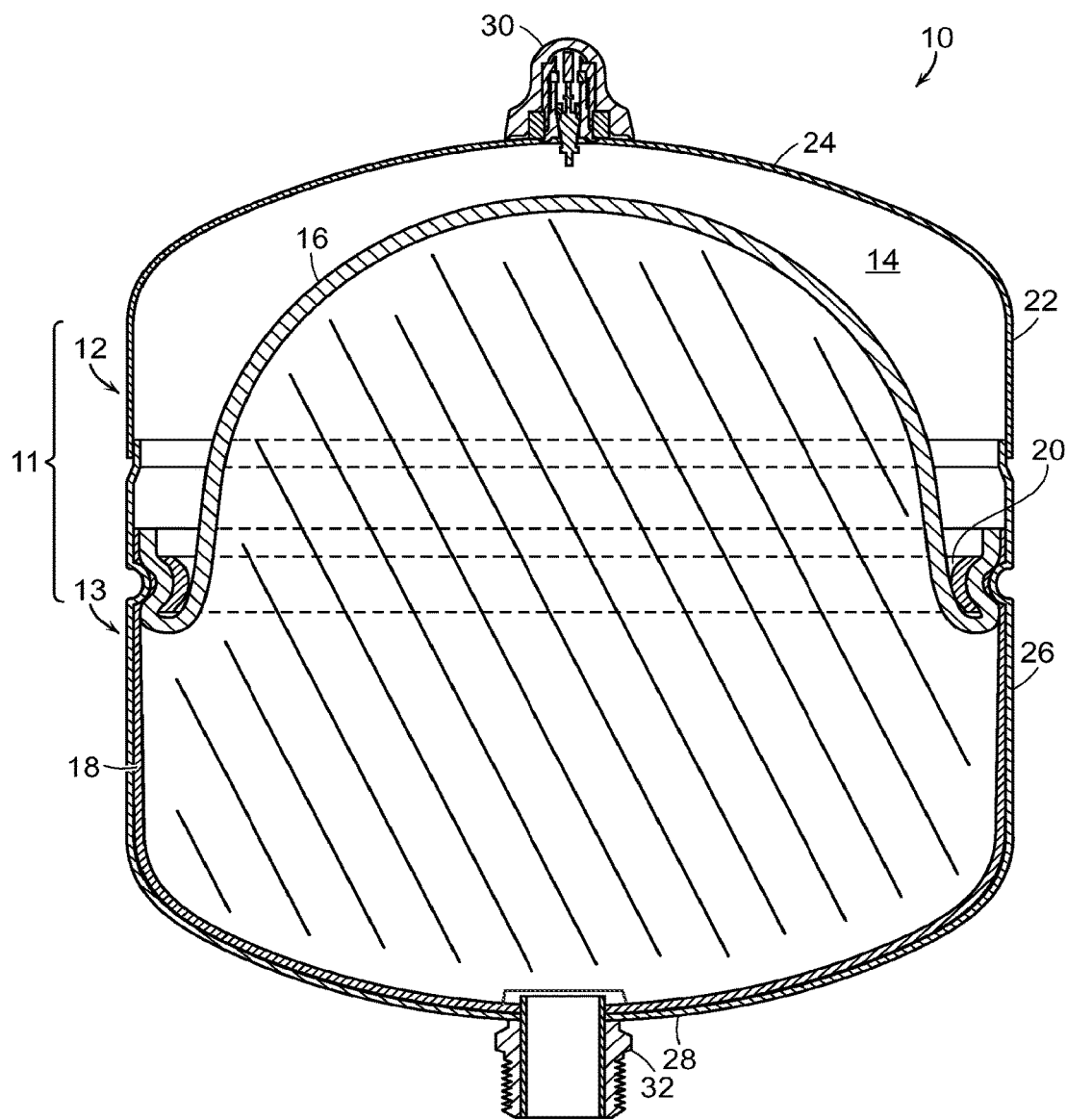
FIG. 4 is a cross-sectional view of the example expansion tank of FIG. 1 in a failure mode with an under-pressurized gas section.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DEFINITIONS

To facilitate an understanding of the present invention, a number of terms and phrases are defined below.

As used herein, the singular forms "a", "an", and "the" include plural forms unless the context clearly dictates otherwise. Thus, for example, reference to "a sensor" includes reference to more than one sensor.

Unless specifically stated or obvious from context, as used herein, the term "or" is understood to be inclusive.

The term "including" is used herein to mean, and is used interchangeably with, the phrase "including but not limited to."

As used herein, the terms "comprises," "comprising," "containing," "having" and the like can have the meaning ascribed to them in U.S. Patent law and can mean "includes," "including," and the like; "consisting essentially of" or "consists essentially" likewise has the meaning ascribed in U.S. Patent law and the term is open-ended, allowing for the presence of more than that which is recited so long as basic or novel characteristics of that which is recited is not changed by the presence of more than that which is recited, but excludes prior art embodiments.

As used herein an "excessive" amount of moisture means any moisture present in the pressurized gas side of the tank as a result of a compromised diaphragm.

As used herein a "predetermined level of moisture or greater" is one which causes the cap to change from one color to another color, such as by causing a hydrochromic ink to change color, or by causing a material (e.g., steel) forming the pressurized gas side of the tank to corrode and rust or by allowing water droplets or a water volume to be present. Such a predetermined level can include in some embodiments a trace amount of moisture, or in other embodiments any amount of moisture such that water droplets form and even a water volume exists Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

Any devices, components, apparatus, or methods provided herein can be combined with one or more of any of the other devices, components, apparatus, and methods provided herein.

DETAILED DESCRIPTION

Incorrect installations of well/expansion tanks, as well as incorrect gas pre-charging and gas loss failures, may lead to eventual tank failures that may cause water to leak from the tank. Tank under sizing also results in more stress on the tank and can result in premature failure of the tank. The present invention provides an indicator for an expansion tank that can alert a user to a problem with the system, before a tank failure or leak occurs, and/or at any time after a tank failure or leak occurs. In particular, the present invention provides an indicator that displays a first color when the tank is operating under normal operational conditions (i.e., wherein no moisture or an undetectable level of moisture is present on the gas side of the tank), and that displays a second color when problems with the tank have been detected (i.e., wherein any moisture or a detectable level of moisture is present in the gas side of the tank). This provides a visual aid indicating problems with the tank and can be used to indicate if maintenance or replacement of the tank is required.

Referring now to FIGS. 1-4, an exemplary pre-pressurized expansion tank 10 is shown. It is noted that the general features of the expansion tank 10 can be in accordance with known expansion tanks, and the exemplary expansion tank 10 shown in the figures is one example thereof. The features of the expansion tank 10 depicted in the figures are similar to those shown in U.S. Pat. No. 5,386,925, issued Feb. 7, 1995, and entitled Expansion Tank and U.S. Pat. No. 7,032,628, issued Apr. 25, 2006, and entitled Mobile Prepressurized Diaphragm Type Fluid Storage Tank, both of which are incorporated herein by reference.

In the example shown herein, the tank 10 has a housing 11, formed by an upper housing 12 and a lower housing 13, that defines an internal cavity 14. A deformable diaphragm 16 and a liner 18 are positioned within the cavity 14 and are removably attached to the lower housing 13, for example, by a retaining ring 20 or the like. An indicator 30 is positioned at a top portion of the upper housing 12 as is described in more detail below.

The upper housing 12 has a generally cylindrical side wall 22 and an end wall 24. The upper housing 12 can be of any size depending on the desired total volume of tank 10 and can be of the same general design as the lower housing 13. A conventional valve 50, such as a "Schrader" valve or the like, is preferably provided in the end wall 24 of the upper housing 12 to allow the addition or removal of air (gas) to/from cavity 14 for pressurizing the tank 10.

Figure 5:
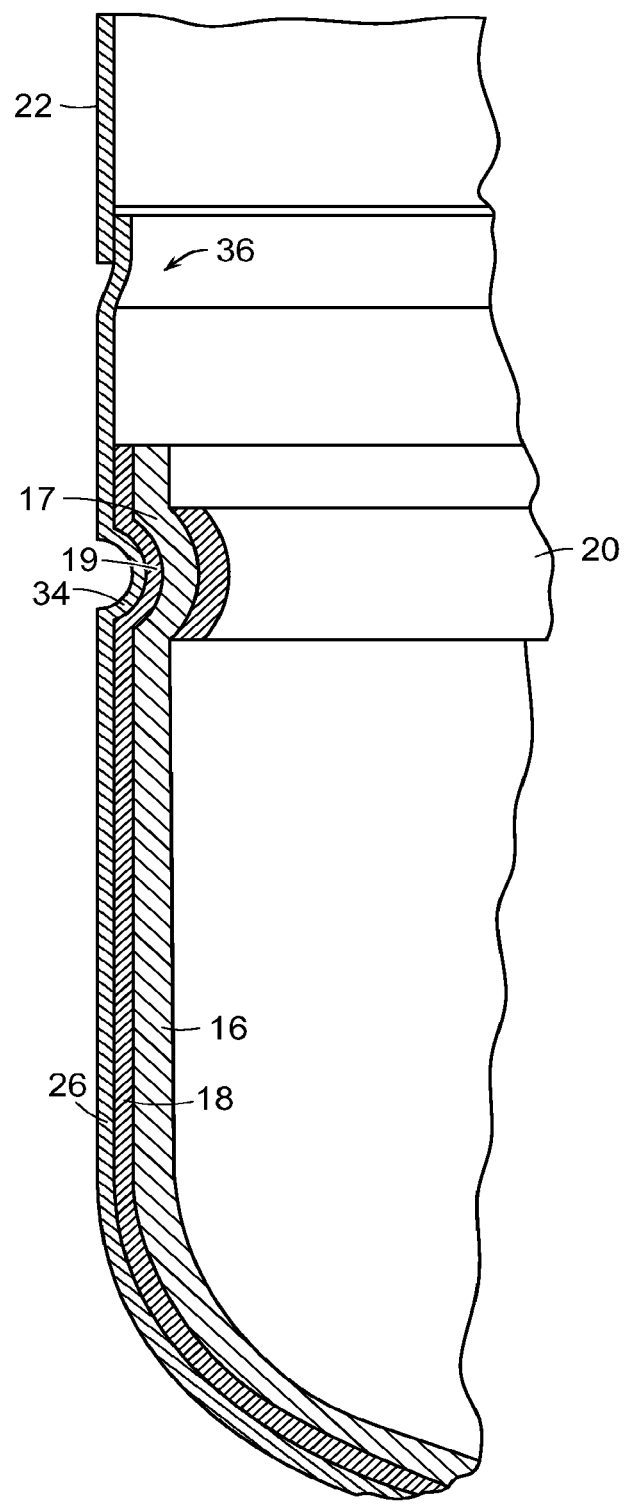
FIG. 5 is an enlarged cross-sectional view of a portion of the example expansion tank of FIG. 1.

The lower housing 13 also has a generally cylindrical side wall 26 and an end wall 28. The lower housing 13 can also be of any size depending on the desired total volume of tank 10. A fitting 32 is provided in end wall 28 of lower housing 13 to allow water to flow into and out of the tank 10. As best shown in FIG. 5, the sidewall 26 can have a concave groove 34 formed around its circumference, which can mate with grooves formed in the diaphragm 16, liner 18 and retaining ring 20, as described below. The sidewall 26 can further have an inset portion 36 (as best shown in FIG. 5) formed at an end of the sidewall 26, which creates an overlap joint with the sidewall 22 of the upper housing 12 when the tank 10 is assembled. Once assembled, the upper housing 12 can be welded or otherwise secured to the lower housing 13.

The upper and lower housings 12, 13 and retaining ring 20 can be made of any suitable material capable of withstanding the pressure desired and compatible with the fluids to be stored and dispensed. High strength structural steel is one conventional material that has been used for making the upper and lower housings 12, 13 and retaining ring 20 and allows the upper and lower housings 12, 13 to be joined together by a welding process. However, a mechanical joint also can be used to join upper and lower housings 12, 13 which can be formed of any materials, as long as it provides a structural hermetic seal.

As shown the figures, the retaining ring 20 is arcuate with a concave outer portion and a convex inner portion, which corresponds to and mates with the groove 34 in the sidewall 26, the groove 17 in the diaphragm 16, and the groove 19 in the liner 18, as described in more detail below, to anchor the diaphragm 16 and liner 18 in place and provide a water and gas tight seal.

The diaphragm 16 is flexible and is preferably made of an elastomer, such as butyl rubber, and is disposed inside of the lower housing 13. As shown in FIG. 5, the diaphragm 16 has an inwardly protruding groove 17 adjacent its end and is situated so that its end is adjacent the end of liner 18. As such, the groove 17 corresponds to and mates with the groove 34 of the lower housing 13 and the retaining ring 20 to mechanically lock or secure the diaphragm 16 to the lower housing 13. According to various embodiments, the diaphragm 16 is preferably molded to conform to the inner shape of lower housing 13. Thus, the diaphragm 16 is compressed between retaining ring 20 and sidewall 26 of lower housing 13, forming a hermetic seal against air and the fluid.

The liner 18 is preferably made of a liquid-impervious material, such as polypropylene, and is disposed to cover the inner surface of the lower housing 13. As shown, the liner 18 is positioned between the lower housing 13 and diaphragm 16. The liner 18 also preferably has an inwardly protruding groove 19 adjacent its end and is situated so that its end is adjacent the end of the diaphragm 16. As such, the groove 19 corresponds to and mates with the groove 34 of the lower housing 13 and retaining ring 20 to mechanically lock or secure liner 18 to the lower housing 13. Thus, the liner 18 is compressed between retaining ring 20 and sidewall 26 of the lower housing 13, forming a hermetic seal against air and the fluid.

The portion of the cavity 14 disposed between the liner 18 and diaphragm 16 forms a water receiving portion of cavity 14. The water is, thus, contained between liner 18 and diaphragm 16 so that the entire inner surface of upper and lower housings 12, 13 is shielded from the water. As a result, corrosion of the tank 10 can be prevented. This beneficially allows construction of the tank 10 from any desired material, without regard to the effect of water on that material. As shown in FIGS. 1-4, the liner 18 also has an aperture that aligns with fitting 32 and provides a liquid tight seal with fitting 32 to prevent water in the tank 10 from flowing between the liner 18 and fitting 32.

As shown generally in FIGS. 1-4, an indicator 30 is provided in the end wall 24 of the upper housing 12 of the tank 10. The indicator 30 is in communication with the contents of the cavity 14, particularly the contents of the cavity 14 positioned above the diaphragm 16. In other words, the indicator 30 is in communication with the pressurized gas portion, which is between the upper end wall 24 and the diaphragm 16.

According to an exemplary embodiment as shown in the figures, the indicator 30 is in communication with the valve 50 so as to allow the contents of the tank to come into contact with the indicator 30 via the valve 50. For example, as shown in the figures, the indicator 30 may be configured to cover or enclose a portion of the valve 50 on the exterior surface of the tank 10. Preferably, the indicator encloses the valve 50 on the exterior surface of the tank 10 such that actuation of the valve 50 to expels the contents (pressurized gas) of the tank 10 positioned above the diaphragm 16 results in the pressurized gas entering the indicator 30 and being contained therein.

According to an embodiment, the indicator 30 is installed in connection with the tank 10, preferably in connection with the valve 50, in such a way that an air-tight seal is formed between the indicator 30 and the tank 10. As such, leakage of gas and liquids into the indicator 30 (i.e., from the external atmosphere) and out of the indicator 30 (i.e., into the external atmosphere) is prevented. For example, the indicator 30 may include one or more seals to ensure an air-tight seal between the indicator 30 and the tank 10 such that contents of the tank will not leak out through the indicator 30 over time.

According to various embodiments, the indicator 30 can be configured so as to display a particular color when the amount of moisture in the pressurized gas side of the tank 10 is within acceptable limits, and to display a different color when the amount of moisture is above acceptable limits. For example, the indicator 30 can display a color that will stand out from the other nearby components of the tank 10 (e.g., red, orange or the like) when the amount of moisture in the pressurized gas side of the tank 10 is above acceptable limits. On the other hand, when the amount of moisture in the pressurized gas side of the tank 10 is within acceptable limits, then the indicator 30 will display a different color. For example, the different color may, for example, be any color similar to nearby components of the tank 10 so as to blend in (e.g., black, grey, silver, white, etc.). Thus, the indicator 30 provides a user with a simple visual mechanism by which it can be determined whether or not there are operational problems in the tank 10. Such a simple visual mechanism can alert a user to early problems present in the tank 10 that can potentially be addressed by routine maintenance, thereby potentially avoiding further failure of the tank 10 that may result is system performance reduction or subsequent system component failures. Further the visual mechanism can alert a user to tank failure, thereby allowing a user to replace a failed tank in a more timely manner.

The indicator 30 can be of any configuration that will cover or encase the portion of the tank 10 (e.g. valve 50 on the exterior of the tank 10) and that will allow the contents of the tank expelled from the valve 50 to enter the indicator 30 and be contained therein. For example, the indicator 30 can have an overall dome-like shape (such as that shown in FIGS. 6A-B), box-like shape, cylindrical shape, cone-like shape, etc.

Figure 6B:
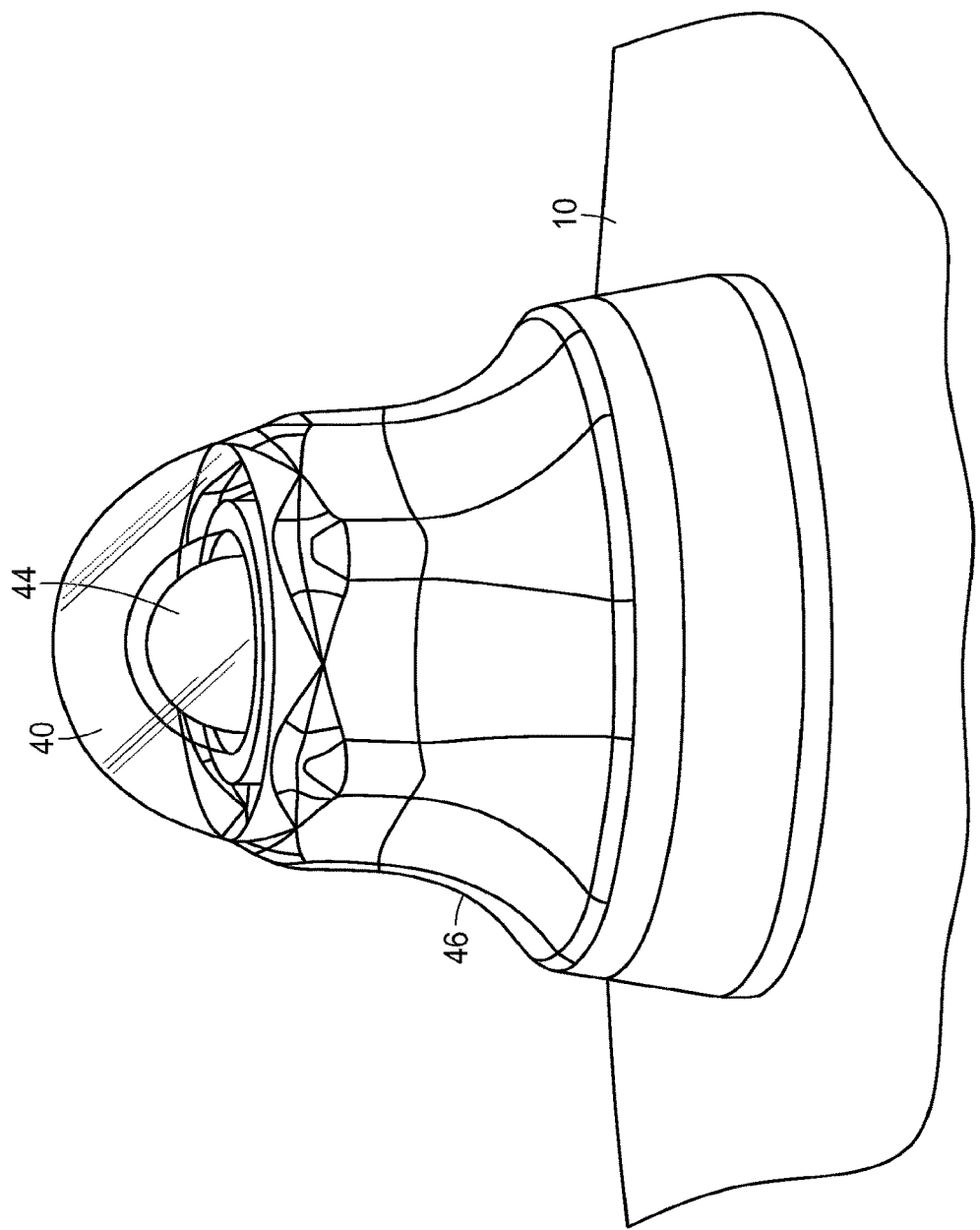
FIG. 6B is an enlarged cross-sectional view of the example indicator shown in FIG. 6 in the alert/failure position.

As shown in the exemplary embodiment in FIGS. 6A-B, the indicator 30 includes an upper cap 40, side walls 46 extending from the cap 40 and engaging the outer surface of the tank 10, and a cap insert 42 at least partially disposed within the cap 40. The cap 40 can have a generally domed rounded structure as shown in the figures, or it can be of any other configuration that allows it to contain at least a portion of the cap insert 42 therein.

At least a portion of the indicator 30 is fabricated of a transparent material through which a user can view the contents of the indicator 30. In particular, the indicator 30 is fabricated of a transparent material in at least a portion that allows a user to clearly view the cap insert 42. For example, the entire cap 40 can be made transparent, as shown in FIG. 6B so as to allow easy and unobstructed viewing of the cap insert 42 therethrough. As shown in FIG. 6B, the remainder of the indicator 30, such as the side walls 46, can be fabricated of a non-transparent material, or can be fabricated of a transparent material, if desired.

According to embodiments of the present invention, at least a portion of the cap insert 42 is fabricated so as to display a second color when it is exposed to predetermined levels of moisture or to display water if a water volume is present, and to display a first color when it is under normal operating conditions. In general, there should not be any moisture present within the pressurized a gas side of the tank 10 and, thus, no level of moisture or only a trace level of moisture is acceptable. In some embodiments, an "acceptable" level of moisture is the level below that which is detectable by the cap insert 42 in order to trigger the cap insert 42 to change color.

For example, at least a portion of the cap insert 42 can be fabricated so as to display a first color when it is exposed to no moisture or less than detectable levels of moisture, and to display a second color when it is exposed to any level of moisture greater than about zero (e.g., detectable levels of moisture). As such, a user can simply view the cap insert 42 through the cap 40 to determine the color of the cap insert 42 and, as a result, be alerted as to the functioning of the tank 10.

According to an embodiment, the cap 40 is fabricated of material that optically magnifies the contents of the cap 40 viewed therethrough. As such, one can more easily view the cap insert 42 and see the color so as to determine whether the tank 10 is "good" or "faulty".

According to an exemplary embodiment, the cap insert 42 has an upper portion 44, which can be dome-like in shape as shown in FIG. 6B, that projects into the cap 40 portion of the insert 30. The upper portion 44 is configured and disposed within the cap 40 so as to be clearly visible through the cap 40.

According to one preferred embodiment, at least a portion of the cap insert 42 (e.g. the upper portion 44 which is visible through the cap 40) is formed to have a first color which is the color that indicates that the tank is functioning properly. When the pressurized gas side of the tank 10 is exposed to moisture, material forming the pressurized gas side of the tank 10 will corrode and rust. This corrosion and rust present in the internal environment will quickly deposit rust residue onto the surface of the cap insert 42. As such, the first color of the cap insert 42 is preferably one which is in contrast with the color of deposited rust, which is typically a red-orange-brown-color. According to a preferred embodiment, the cap insert 42 is a light color such as a bright white color, which provides a sharp contrast with deposited rust. The bright white or other color of the cap insert 42 can be provided by any conventional method. In some embodiments, the material forming the cap insert 42 (or a portion of the cap insert 42, such as the upper portion 44, visible through the cap 40) can itself be one which is the desired first color. For example, the cap insert 42 or portion thereof can be molded or otherwise formed from a white or other colored plastic material into the desired shape. Alternatively, the cap insert 42 can be formed of any material of any color and can be subsequently colored as desired.

According to other embodiments, at least a portion of the indicator 30 which is in communication with the cap insert 42 is formed of a material that will corrode and rust when exposed to moisture. This makes it possible to form the tank 10, including the pressurized gas side, of a material that is resistant to corrosion. In such embodiments, the tank 10 is tested so as to allow pressurized gas from the pressurized gas side of the tank to enter to indicator 30. If moisture is present in the pressurized gas, it will corrode and rust the portion of the indicator 30. This corrosion and rust present in the internal environment of the indicator 30 will quickly deposit rust residue onto the surface of the cap insert 42. A further embodiment is that water droplets or a water volume will accumulate in between the cap insert 42 and the cap 40 where it will be visible in the upper portion 44.

According to some embodiments, at least a portion of the cap insert 42 visible through the cap 40 (e.g. the upper portion 44) is coated with a hydrochromic ink. Hydrochromic inks are well known and will not be described in great detail herein. Rather, such known hydrochromic inks can suitably be used.

For example, in one embodiment, the hydrochromic ink can display a first color when it is in normal operating condition. and can display a second color when it is in contact with a predetermined amount of moisture or greater (e.g. a detectable level of moisture, such as greater than trace levels of moisture or greater than zero moisture). As such, the upper portion 44 (or other desired portion of the cap insert 42) can simply be coated with the hydrochromic ink. Any contact of the hydrochromic ink coated portion with the predetermined amount of moisture or greater will result in the ink displaying the second color, indicating problems with the tank. The second color is preferably any color that will stand out to a user, for example, red, orange, etc. The second color can be any color different than the first color (e.g. white, silver, grey etc.).

In another embodiment, the hydrochromic ink can display the first color when it is in contact with less than the predetermined amount of moisture, and can become transparent when it comes into contact with the predetermined amount of moisture or greater. As such, the upper portion 44 (or other desired portion of the cap insert 42) can be coated with the second color that alerts a user when there is a problem with the tank (e.g. excessive moisture/any amount of moisture). The second color can then be coated with the hydrochromic ink. Any contact of the hydrochromic ink coated portion with the predetermined amount of moisture or greater will result in the ink becoming transparent to thereby reveal the second color.

According to an exemplary embodiment, the upper portion 44 of the cap insert 42 is provided with a white band (or any other color different than the second color) of hydrochromic ink radially around the cap insert 42. When the white band remains white (or the other color different than the second color) then the tank is considered to be "good" (i.e., no moisture/acceptable levels of moisture present in the pressurized gas side of the tank 10). If water leaks into the pressurized gas side of the tank 10, the water will make its way into the cap 40 of the indicator 30 through the valve 50 together with the pressurized gas (or other means through which pressurized gas exits the tank 10). The pressurized gas containing the water enters into the cap 40 and comes into contact with the hydrochromic ink on the cap insert 42. If water is present in the pressurized gas, then the water will turn the hydrochromic ink invisible, revealing the second color (e.g. red) underneath (or will change the color of the hydrochromic ink to the second color). The change in color (e.g., from white to red) will indicate that the tank 10 has water on the pressurized gas side of the diaphragm 18 and has failed.

According to a preferred embodiment, the cap insert 42 is colored a second color and is then coated with a hydrochromic ink of a first color that (1) becomes transparent to reveal the second color beneath it when contacted with the predetermined amount of moisture or greater, and returns back to the first color once the moisture has dried out, or (2) changes to the second color when contacted with the predetermined amount of moisture or greater, and returns back to the first color once the moisture has dried out. As such, the indicator 30 is reusable and, thus, does not need to be replaced once it has come into contact with moisture and has changed color.

As shown in FIG. 6A, the indicator 30 can be designed to have two plastic molded gaskets, which act as a primary seal 47 and a secondary seal 48. The various parts of the indicator 30 can be formed through any method, such as molding and the like. Preferably, the cap 40 is molded to form a transparent material and the cap insert 42 is molded in a natural or white color and is thereafter colored with the second color and the first color. The various components can be assembled and attached using sonic welding or similar methods that will ensure a good hermetic seal is made.

As shown in FIG. 6A, the primary seal 47 may be disposed at an upper location of the indicator 30 between the cap insert 42 and the valve 50 so as to form a seal between the end of the valve 50 and the upper portion 44 of the indicator 30. The secondary seal 48 can be disposed at a bottom part of the indicator 30 between the valve 50 and the top surface of the tank 10 to provide a seal therebetween that will prevent passage of gas and liquids between indicator 30 and the exterior of the indicator 30.

In order to test the tank 10, the valve 50 is actuated to allow pressurized gas inside the tank 10 to enter the indicator 30, particularly to enter the cap 40 and come into contact with the cap insert 42. If the pressurized gas within an acceptable level then the cap insert 42 remains unchanged in color. On the other hand, if moisture is present in the pressurized gas above an acceptable level, then the cap insert 42 changes color.

According to an exemplary embodiment, the cap insert 42 or portion thereof is a first color and at least a portion of the pressurized gas side of the tank 10 is fabricated of a material that corrodes and rusts when contacted with moisture. According to another exemplary embodiment the cap insert 42 or portion thereof is a second color and at least a portion of the indicator 30 which is in communication with the cap insert 42 is formed of a material that will corrode and rust when exposed to moisture. In such embodiments, if moisture is present in the pressurized gas side of the tank 10, the material forming the pressurized gas side of the tank 10 or the cap insert 42 will corrode and rust when exposed to the pressurized gas containing the moisture. This corrosion and rust present in the internal environment will quickly deposit rust residue onto the surface of the cap insert 42. This deposited rust changes the color of the cap insert 42, thus indicating that there is an excessive amount of moisture in the pressurized gas side of the tank 10. If the moisture in the pressurized gas is within an acceptable level, then the corrosion and rusting does not occur and the color does not change from the first color, indicating that the amount of moisture in the pressurized gas side of the tank 10 is acceptable.

According to another exemplary embodiment, the cap insert 42 is colored a second color (e.g. red) and is then colored a first color using a hydrochromic ink. If moisture is present in the pressurized gas above an acceptable level, then the hydrochromic ink becomes transparent and the cap insert 42 changes color to the second color to indicate that there is an excessive amount of moisture in the pressurized gas side of the tank 10. If the moisture in the pressurized gas is within an acceptable level, then the hydrochromic ink does not change, and the cap insert 42 displays the first color to indicate that the amount of moisture in the pressurized gas side of the tank 10 is acceptable.

The present design helps a homeowner and/or plumber to visually inspect the tank 10 on a more regular basis without having to remove the tank 10 from the system. As such, the plumber or homeowner can be more pro-active with maintaining the equipment being used. The present indicator 30 can also beneficially adapt easily to any existing tank having a common valve, e.g. a Schrader style air valve, which is present on all expansion tanks. As such, the indicator 30 can be simply attached to the tank 10 about the valve 50 without requiring any modification to the tank 10 design itself.

Furthermore, according to various embodiments, the indicator may be adapted with the appropriate electronics/software to forward an alert to an email address, cellular phone, or smart phone to alert the user if moisture has been detected.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A tank comprising:
   a housing defining a cavity and being formed of a material that corrodes and rusts when in contact with a pressurized fluid;
   a flexible member positioned within the cavity and connected to the inner wall of the housing, the flexible member separating the cavity into a first portion sealed to contain a pressurized gas and a second portion sealed to contain the pressurized fluid;
   an indicator connected to the housing in communication with the pressurized gas in the first portion of the cavity, the indicator including a cap and an insert disposed within the cap, the cap being connected to an outer surface of the housing and including a transparent portion, and the insert including a display portion that is a first color and that extends into and is spaced from the transparent portion of the cap to form with the cap an area for receiving the pressurized gas and/or fluid; and
   a valve at least partially enclosed by the indicator and in communication with the first portion of the cavity and the indicator such that pressurized gas and/or fluid expelled from the valve enters the indicator, the valve including a valve body and a valve stem,
   wherein the valve body is connected to the insert and a ledge of the insert is configured to actuate the valve stem to allow the pressurized gas to enter the area,
   wherein when the pressurized gas is free of the pressurized fluid, the first color of the insert is visible, and
   wherein when the pressurized gas includes a level of pressurized fluid that causes the material of the housing to corrode and rust, the pressurized fluid will be a second color visible through the transparent portion.

2. The tank according to claim 1, wherein the transparent portion of the cap is formed of a material that optically magnifies the contents of the cap.

3. The tank according to claim 1, further including a seal between the outer surface of the housing and the indicator that prevents pressurized gas and/or fluid from the cavity from leaking to an environment through the indicator.

4. The tank according to claim 1, wherein the valve body includes threads on an outer surface thereof and the insert includes threads on an inner surface thereof that mate with the threads on the valve body.

5. The tank according to claim 1, furthering including a seal between the valve body and the insert.

6. The tank according to claim 1, further including a seal between the outer surface of the housing, the valve, and the indicator that prevents pressurized gas and/or fluid expelled from the valve from leaking to an environment.

7. The tank according to claim 1, wherein the indicator has a dome shape.

8. A tank comprising:
   a housing defining a cavity;
   a flexible member positioned within the cavity and connected to an inner wall of the housing, the flexible member separating the cavity into a first portion sealed to contain a pressurized gas and a second portion sealed to contain a pressurized fluid;
   an indicator connected to the housing in communication with the first portion of the cavity, the indicator including a cap sealed to an outer surface of the housing and an insert at least partially disposed within the cap, wherein an area is formed between the cap and insert defining a space for the pressurized gas, and wherein a first color is visible through the indicator when the pressurized gas has a level of moisture below a predetermined level, and a second color is visible through the indicator when the pressurized gas has a level of moisture at or above the pressurized level; and
   a valve at least partially enclosed by the indicator and in communication with the first portion of the cavity and the indicator such that pressurized gas expelled from the valve enters the indicator, wherein the valve includes a valve body and a valve stem, wherein the valve body is connected to the insert and a ledge of the insert is configured to actuate the valve stem to allow the pressurized gas to enter the area.

9. The tank according to claim 8, wherein the valve body includes threads on an outer surface thereof and the insert includes threads on an inner surface thereof that mate with the threads on the valve body.

10. The tank according to claim 8, furthering including a seal between the valve body and the insert.

11. The tank according to claim 8, wherein at least a portion of the cap is formed of a material that optically magnifies the contents of the cap.

12. The tank according to claim 8, further including a seal between the outer surface of the housing, the valve, and the indicator that prevents pressurized gas expelled from the valve from leaking to an environment.

13. A tank comprising:
- a housing defining a cavity and being formed of a material that corrodes and rusts when in contact with a pressurized fluid;
- a liner positioned within the cavity and connected to an inner wall of the housing;
- a flexible diaphragm positioned within the cavity and connected to the inner wall of the housing, the diaphragm separating the cavity into a first portion sealed to contain a pressurized gas between the inner wall and the flexible diaphragm, and a second portion sealed to contain the pressurized fluid between the liner and the flexible diaphragm;
- a valve extending through the housing into the first portion of the cavity; and
- an indicator connected to the housing and surrounding the valve, the indicator being in communication with the pressurized gas in the first portion of the cavity via the valve and the indicator including a cap and an insert disposed within the cap, the cap being connected to an outer surface of the housing and including a transparent portion, and the insert including a display portion that is a first color and that extends into and is spaced from the transparent portion of the cap to form a space for receiving the pressurized gas and/or fluid,
- wherein the valve includes a valve body and a valve stem, wherein the valve body is connected to the insert and a ledge of the insert is configured to actuate the valve stem to allow the pressurized gas to enter the area,
- wherein when the pressurized gas is free of the pressurized fluid, the first color of the insert is visible though the transparent portion of the cap, and
- wherein when the pressurized gas includes a level of pressurized fluid that causes the material of the housing to corrode and rust, the pressurized gas and pressurized fluid will enter the space and be a second color visible through the transparent portion of the cap.

14. The tank according to claim 13, wherein the valve body includes threads on an outer surface thereof and the insert includes threads on an inner surface thereof that mate with the threads on the valve body.

15. The tank according to claim 13, furthering including a seal between the valve body and the insert.

* * * * *